United States Patent
Pennacino et al.

(10) Patent No.: US 11,396,941 B2
(45) Date of Patent: Jul. 26, 2022

(54) STAGED IMPELLER FOR THE OIL SUPPLY OF AN EPICYCLIC OR PLANETARY REDUCTION GEAR

(71) Applicant: SAFRAN TRANSMISSION SYSTEMS, Colombes (FR)

(72) Inventors: Antoine Jacques Marie Pennacino, Paris (FR); Jean-Charles Michel Pierre Di Giovanni, Issy-les-Moulineaux (FR)

(73) Assignee: SAFRAN TRANSMISSION SYSTEMS, Colombes (FR)

(*) Notice: Subject to any disclaimer, the term of this patent is extended or adjusted under 35 U.S.C. 154(b) by 0 days.

(21) Appl. No.: 17/095,670

(22) Filed: Nov. 11, 2020

(65) Prior Publication Data

US 2021/0148453 A1 May 20, 2021

(51) Int. Cl.
*F16H 57/04* (2010.01)
*F16H 57/08* (2006.01)
*F01D 25/18* (2006.01)

(52) U.S. Cl.
CPC ......... *F16H 57/0482* (2013.01); *F01D 25/18* (2013.01); *F16H 57/045* (2013.01); *F16H 57/046* (2013.01); *F16H 57/0427* (2013.01); *F05D 2260/98* (2013.01)

(58) Field of Classification Search
CPC ............ F16H 57/0482; F16H 57/0427; F16H 57/045; F16H 57/046; F16H 57/042; F16H 57/082; F16H 57/0479; F01D 25/18; F02C 3/107; F02C 7/06; F05D 2260/98
See application file for complete search history.

(56) References Cited

U.S. PATENT DOCUMENTS

| | | | |
|---|---|---|---|
| 10,458,535 | B2 | 10/2019 | Gravina et al. |
| 2013/0051984 | A1 | 2/2013 | Mccune et al. |
| 2013/0225353 | A1 | 8/2013 | Gallet et al. |
| 2013/0287553 | A1 | 10/2013 | Coffin et al. |

(Continued)

FOREIGN PATENT DOCUMENTS

| | | |
|---|---|---|
| FR | 2987416 A1 | 8/2013 |
| FR | 3041054 A1 | 3/2017 |

(Continued)

OTHER PUBLICATIONS

Preliminary Research Report received for French Application No. 1912786, dated Jun. 15, 2020, 5 pages (1 page of French Translation Cover Sheet and 4 pages of original document).

*Primary Examiner* — Tinh Dang
(74) *Attorney, Agent, or Firm* — Womble Bond Dickinson (US) LLP (57) ABSTRACT

An oil supply device intended to supply oil to an epicyclic reduction gear, the oil coming from at least one oil injector fixed with respect to the reduction gear, the oil supply device including at least one cup which is integral with a planet carrier of the reduction gear and substantially annular open radially with respect to an axis of the reduction gear and the walls of which delimit a cavity supplied by the at least one oil injector and which supplies at least one of the oil distribution circuits of the reduction gear. The oil supply device is staged and includes at least two independent stages provided with cups coaxial, of different diameters, each supplying an associated oil circuit and configured to receive the oil axially, centripetally, or tangentially, or according to an inclined direction combining two of the directions.

14 Claims, 8 Drawing Sheets

(56) References Cited

U.S. PATENT DOCUMENTS

2016/0377167 A1 12/2016 Sheridan
2019/0301466 A1 10/2019 Violet

FOREIGN PATENT DOCUMENTS

| FR | 3047279 A1 | 8/2017 |
| WO | 2010/092263 A1 | 8/2010 |
| WO | 2017/129926 A1 | 8/2017 |
| WO | 2019/016463 A1 | 1/2019 |
| WO | 2019/016491 A1 | 1/2019 |

STAGED IMPELLER FOR THE OIL SUPPLY OF AN EPICYCLIC OR PLANETARY REDUCTION GEAR

TECHNICAL FIELD OF THE INVENTION

The field of the present invention is that of turbomachines and more particularly that of differential transmission systems in these turbomachines, in particular epicyclic or planetary reduction gears.

BACKGROUND

Current turbomachines, in particular the turbomachines comprising one or more propellers blowing a secondary flow, comprise a transmission system, called a reduction gear, to drive this or these propellers at an adequate rotational speed from the shaft of the power turbine of the primary body of the engine.

The role of a mechanical reduction gear is to change the speed ratio and torque between the input and output axles of a mechanism.

The new generations of dual flow turbomachines, in particular those with a high bypass ratio, comprise a mechanical reduction gear to drive the shaft of a fan. Usually, the purpose of the reduction gear is to transform the so-called fast rotation speed of the shaft of a power turbine into a slower rotation speed for the shaft driving the fan.

Such a reduction gear comprises a central pinion, called a sun gear, a ring gear and pinions called planet gears, which are meshed between the sun gear and the ring gear. The planet gears are held by a frame called the planet carrier. The sun gear, the ring gear and the planet carrier are planetaries because their axes of revolution coincide with the longitudinal axis X of the turbomachine. The planet gears each have a different axis of revolution and are equally distributed on the same operating diameter around the axis of the planetaries. These axes are parallel to the longitudinal axis X.

There are several reduction gear architectures. In the prior art of double-flow turbomachines, the reduction gears are of the planetary or of the epicyclic type. In other similar applications, there are so-called differential or compound architectures.

On a planetary reduction gear, the planet carrier is fixed and the ring gear constitutes the output shaft of the device which rotates in the opposite direction of the sun gear.

On an epicyclic reduction gear, the ring gear is fixed and the planet carrier is the output shaft of the device which rotates in the same direction as the sun gear.

On a differential reduction gear, no element is fixed in rotation. The ring gear rotates in the opposite direction to the sun gear and the planet carrier.

The reduction gears can be composed of one or more meshing stages. This meshing is ensured in different ways such as by contact, friction or magnetic fields.

There are several types of contact meshing such as straight or chevron toothing.

The epicyclic reduction gears, in particular, have the advantage of offering high speed reduction rates in small spaces. On the other hand, like the differential reduction gears, they have the disadvantage that they have planet gear pinions that move by rotating around the axis of rotation of the drive shaft of the reduction gear, which is coaxial to the planetary. Therefore, they require devices to transfer the oil from a reservoir and pump located in a fixed mark to lubrication means that follow the rotational movement of the axles of the planet gear pinions around the drive shaft. Commonly used devices to solve this problem comprise rotary joint systems.

These systems have the disadvantage of being cumbersome and subject to wear that is not compatible with the lifetimes required for aircraft engines, which impacts the maintenance of these engines. Finally, these reduction gears are difficult to fit with a flexible assembly of the structure of the turbomachine, recommended, for example, to compensate for the loss or breakage of a blade of the fan propeller, or with a modular assembly, to facilitate the assembly of the engine.

In order to remedy these disadvantages, the applicant has already proposed, in the patent applications WO-A1-2010/092263, FR-A1-2987416, WO-2019/16463-A1 and WO-2019/16491-A1, lubrication devices without rotating joints, where an oil injection system comprising a supply means with nozzles sprays the oil coming from a circuit connected to the fixed mark to an oil supply device (known as a "impeller" or "distributor") comprising a cup which is integral with a planet carrier. The cup, which is in rotation with the oil supply device (known as the "impeller" or "distributor") around the injection means, confines the oil recovered by centrifugation before directing it to the means for lubricating the pinions.

These devices thus greatly improve the reliability of the lubrication system of the reduction gear and its maintenance.

In addition, the technical solution described in the patent application FR-3.047.279-A1 attempts to adjust the oil flow rate to different gears according to their lubrication needs. For this purpose, the receiving cup of the oil supply device is segmented into segments along the axis of rotation and axially offset supplying means comprise axially offset nozzles which supply these segments. These segments delimit cavities associated with different circuits, which communicate with each other by overflow. The oil recovered by each axial segment is then directed to a circuit dedicated to a type of meshing or other member to be lubricated.

However, this solution does not allow the oil flow distribution between the segments to be modulated according to the speed of the turbomachine. Moreover, it is relatively complex with nozzles placed on the same diameter and dedicated to each axial section. Moreover, the multiplication of the number of nozzles and their proximity can raise questions of reliability.

The technical solution described in the patent application FR-3.041.054-A1 also attempts to adjust the oil flow rate to different lubrication stations such as gears according to their lubrication requirements. For this purpose, the receiving cup of the oil supply device (known as a "impeller" or "distributor") is segmented into a circumferential succession of bowls arranged around the axis of rotation and nozzles of a injection means of the oil injection system supply these segments. The oil recovered by each bowl is then directed to a circuit dedicated to a particular lubrication station.

However, this solution does not allow to modulate the oil flow rate distribution between the lubrication stations to be supplied other than by modulating the oil flow rate that each bowl supplies to the circuit associated with it, because the bowls are supplied by the same nozzles of the same supply means and therefore with the same flow rate. This solution also does not allow to differentiate the type of lubricant used, in particular in terms of viscosity, temperature or filtration, in order to use lubricants with different properties adapted to the needs of the members or gears to be lubricated. In addition, the supply of the bowls is significantly irregular because it involves the passage of the bowls in front of the nozzles.

Furthermore, in both designs, since the oil circuits are supplied by axial cup segments or reservoirs that are all placed at approximately the same diameters, the circuits that are placed on the larger diameters suffer significant pressure drops.

To overcome these drawbacks, an oil supply device was proposed in the document US-2016/377167-A1 that comprises of two coaxial, staged, lubrication annular cups, each supplying different oil distribution circuits of the reduction gear and configured to receive oil from two oil injection means to form two separate lubrication stages. The oil injection means are injection manifolds providing oil jets centrifugally. Therefore, the injection manifolds are close to the axis of the reduction gear and are difficult to mount.

The invention is intended to overcome this disadvantage, while improving the advantages of the technical solutions proposed in the above-mentioned patent applications.

SUMMARY OF THE INVENTION

For this purpose, the invention relates to an oil supply device extending around an axis X, intended to supply oil to two distinct oil distribution circuits of a reduction gear, the reduction gear comprising at least one sun pinion, a planet carrier and a ring gear which are r mobile in rotation relatively with respect to each other, the oil being intended to come from at least one oil injection means fixed with respect to the reduction gear, said device being intended to be fixed to the planet carrier and comprising a lubrication annular cup configured to receive oil coming from said at least one oil injection means and to allow the supply of oil to one of said oil distribution circuits, the device comprising at least one further lubrication cup so that it can be staged in at least two separate lubrication stages, the further cup being configured to receive oil coming from a further oil injection means and to allow the supply of oil to a further of said oil distribution circuits, each cup supplying an associated and distinct oil circuit, the cups being coaxial and of different diameters, characterized in that said cups are configured to receive oil axially in a direction that is parallel to the axis X and facing the associated cup, or centripetally in a radial direction facing the axis X, or tangentially, or according to an inclined direction combining two of said directions.

According to other characteristics of the supply device:
the device comprises at least:
a first annular cup, the associated oil distribution circuit of which comprises a plurality of nozzles distributed angularly around the axis X and which supply oil to the sun pinion and/or the planet gears, and
a second annular cup, the associated oil distribution circuit of which supplies oil to the planet gear bearings on the planet carrier,
at least one annular cup has an outer part having a section substantially in the shape of a U of radial orientation open towards the axis X and an inner part extending the outer part starting from a branch of the U which delimits a J- or V-shaped gutter configured to receive oil jets inclined according to a direction having at least one radial centripetal component facing towards the axis X and an axial component or axial and tangential component facing towards the cups, or an open L-shaped gutter opposite the cups supplied by purely axial oil jets or axial and tangential oil jets,
the annular cup is angularly divided into adjoining compartments which delimit as many reservoirs supplying the oil distribution circuits, separated by axial walls arranged at the angular ends of said compartments, free ends of said axial walls being bevelled towards the axis of the reduction gear to allow the passage of oil from a reservoir of one compartment to the reservoir of the adjacent compartment,
the gutter comprises fins extending substantially in a radial direction and which are arranged in said inner part to drive the oil by centrifugation at the bottoms of the reservoirs,
the fins are radial or inclined with respect to the radial direction and/or have a vane profile,
each cup is connected to the adjacent cup by structural arms,
at least one cup comprises an extra thickness that can be machined locally to allow the balancing of said cup,
at least one cup comprises a zone capable of receiving at least one weight for balancing said cup.

The invention also concerns an oil injection system for supplying oil to an oil supply device of the type described above, characterized in that it is staged and comprises at least two distinct oil injection means each supplying a corresponding cup of the device.

According to other characteristics of the oil injection system:
each oil injection means of a cup comprises an annular tubular injection manifold, or a plurality of angular segments of annular tubular manifold, of diameter substantially slightly larger than that of the corresponding cup, comprising circumferentially distributed holes intended to be oriented towards the opening of the gutter of the corresponding cup and at least one mainly radial duct for supplying oil to said annular manifold or said annular manifold angular segment,
each oil injection means is supplied with an oil adapted to the requirements of a member of the reduction gear which is lubricated by the corresponding cup.

Finally, the invention concerns a lubrication set for an epicyclic or differential reduction gear, characterized in that it comprises an oil supply device according to one of the claims and an oil injection system of the type described above.

BRIEF DESCRIPTION OF THE FIGURES

Other characteristics and advantages of the invention will appear during the reading of the detailed description that will follow for the understanding of which one will refer to the annexed drawings in which.

DETAILED DESCRIPTION OF THE INVENTION

Figure 1:
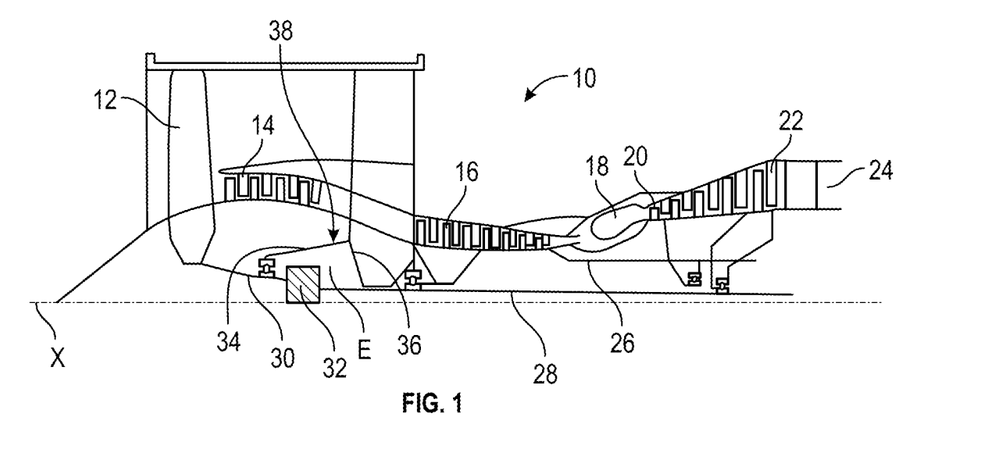
FIG. 1 is a schematic axial section view of a turbomachine using the invention.

FIG. 1 describes a turbomachine 10 which comprises, in a conventional manner, a fan 12, a low-pressure compressor 14, a high-pressure compressor 16, an annular combustion chamber 18, a high-pressure turbine 20, a low-pressure turbine 22 and an exhaust pipe 24. The high-pressure compressor 16 and the high-pressure turbine 20 are connected by a high-pressure shaft 26 and form with it a high-pressure (HP) body. The low-pressure compressor 14 and the low-pressure turbine 20 are connected by a low-pressure shaft 28 and form a low-pressure (LP) body with it.

The fan 12 is driven by a fan shaft 30 which is driven by the LP shaft 28 by means of a reduction gear 32. This reduction gear 32 is usually of the planetary or epicyclic type.

Although the following description refers to a planetary or epicyclic reduction gear, it also applies to a mechanical differential in which the three components, i.e. the planet carrier, the ring gear and the sun gear, are mobile in rotation, the rotational speed of one of these components depending, in particular, on the speed difference of the other two components.

The reduction gear 32 is positioned in the upstream part of the turbomachine. A fixed structure comprising schematically, here, an upstream part 34 and a downstream part 36 which composes the engine casing or stator 38 is arranged so as to form an enclosure E surrounding the reduction gear 32. This enclosure E is here closed upstream by seals at the level of a bearing allowing the passage of the fan shaft 30, and downstream by seals at the level of the passage of the LP shaft 28.

Figure 2:
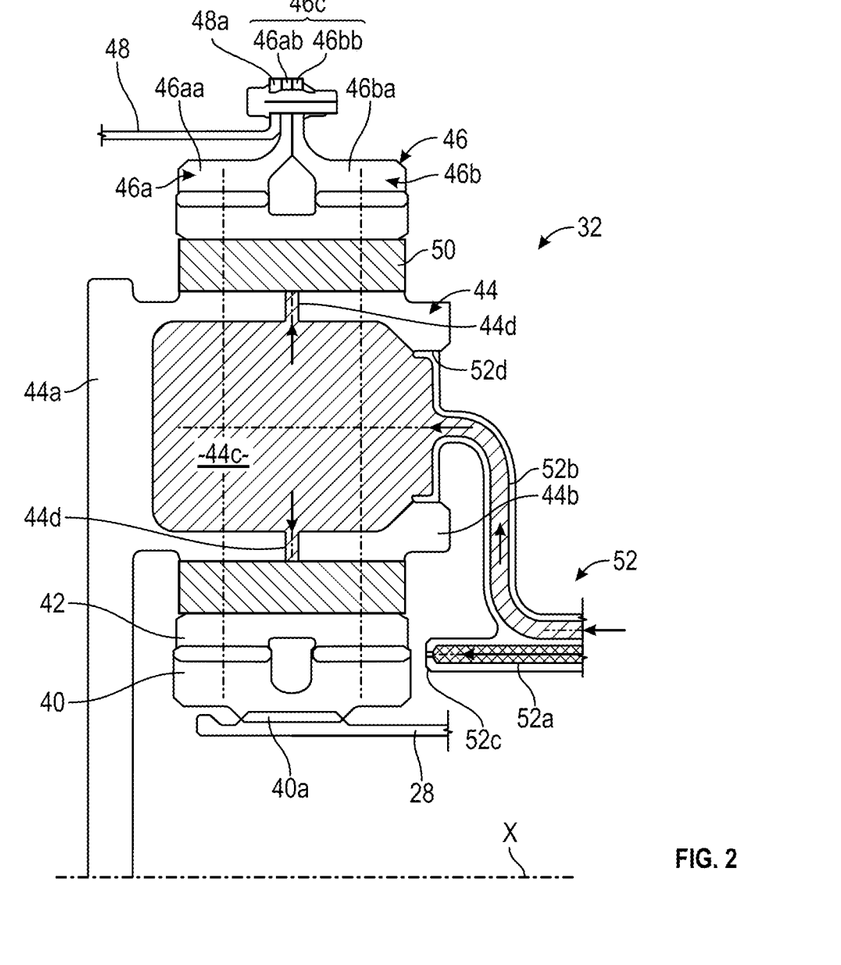
FIG. 2 is a partial axial section view of a mechanical reduction gear.

FIG. 2 shows a reduction gear 32 which can take the form of different architectures according to whether some parts are fixed or in rotation. At the input side, the reduction gear 32 is connected to the LP shaft 28, e.g. via internal splines 40a. Thus the LP shaft 28 drives a planetary pinion called the sun gear 40. Classically, the sun gear 40, the axis of rotation of which is the same as that of the turbomachine X, drives a series of pinions called planet gears 42, which are equally distributed on the same diameter around the axis of rotation X. This diameter is equal to twice the operating centre distance between the sun gear 40 and the planet gears 42. The number of planet gears 42 is generally defined between three and seven for this type of application.

The set of planet gears 42 is maintained by a frame called planet carrier 44. Each planet gear 42 rotates around its own axis and meshes with a ring gear 46.

In an epicyclic configuration, the set of planet gears 42 drive the planet carrier 44 around the axis X of the turbomachine. The ring gear 46 is fixed to the engine casing or stator 38 via a ring gear carrier 48 and the planet carrier 44 is fixed to the fan shaft 30.

In a planetary configuration, the set of planet gears 42 is held by a planet carrier 44 which is attached to the engine or stator housing 38. Each planet gear 42 drives the ring gear 46 which is attached to the fan shaft 30 via a ring gear carrier 48.

Each planet gear 42 is freely mounted in rotation by using a bearing 50, e.g. of the bearing or hydrodynamic bearing type. Each bearing 50 is mounted on one of the axles 44b of the planet carrier 44 and all axles are positioned with respect to each other by using one or more structural frames 44a of the planet carrier 44. There is a number of axles 44b and bearings 50 equal to the number of planet gears 42. For operational, assembly, manufacturing, inspection, repair or replacement reasons, the axles 44b and the frame 44a can be separated into several parts.

For the same reasons as mentioned above, the toothing of a reduction gear can be separated into several propellers, in particular an upstream and a downstream propeller, so called with respect to a plane of symmetry of the reduction gear and with respect to an upstream to downstream orientation according to the direction of the engine. In our example we detail the operation of a reduction gear with several propellers with a ring gear 46 separated into two half-ring gears 46a and 46b.

An upstream half-ring gear 46a consists of a rim 46aa and a mounting half-flange 46ab. On the rim 46aa is the upstream propeller of the toothing of the reduction gear. This upstream propeller meshes with that of the planet gear 42 which meshes with that of the sun gear 40.

A downstream half-ring gear 46b consists of a rim 46ba and a mounting half-flange 46bb. On the rim 46ba is the rear propeller of the toothing of the reduction gear. This downstream propeller meshes with that of the planet gear 42 which meshes with that of the sun gear 40.

The mounting half-flange 46ab of the upstream ring gear 46a and the mounting half-flange 46bb of the downstream ring gear 46 form the mounting flange 46c of the ring gear 46. The ring gear 46 is attached to a ring gear carrier by assembling the mounting flange 46c of the ring gear and a mounting flange 48a of the ring gear carrier 48 using a bolted assembly for example.

The arrows in FIG. 2 describe the oil flow in the reduction gear 32. The oil is fed into the reduction gear 32 from the stator part 38 into the oil supply device, in this case a distributor 52, by various means which will not be specified in this view as they are specific to the type of architecture of the reduction gear.

The distributor 52 is separated into two parts, usually each repeated by the same number of planet gears. The nozzles 52a of the distributor 52 have the function of lubricating the toothing and the arms 52b of the distributor 52 have the function of lubricating the bearings. The oil is fed to the nozzle 52a and out at the end of the nozzle 52c to lubricate the toothing.

The oil is also fed to the arm 52b and circulates through the supply port 52d of the bearing. The oil then flows through the axle into one or more buffer zone(s) 44c and out through orifices 44d to lubricate the bearings of the planet gears 42.

The conventional designs use a single cup (not shown in FIG. 2) to supply the nozzles 52a and the arms 52b. Under these conditions, it is not possible to modulate the distribution of the oil flow between the stations to be lubricated because the nozzles 52a and the arms 52b are supplied by the same cup and by the same injectors of the injection system, with the same flow rate.

These usual designs also do not allow to differentiate the type of lubricant used, in particular in terms of viscosity, temperature or filtration, in order to use lubricants with different properties adapted to the needs of the members or gears to be lubricated.

In addition, in these common designs, the nozzles 52a and arms 52b are centrifugally supplied by a single cup placed at a specific diameter, and as a result the ends of the arms 52b, which are placed on a larger diameter than the nozzles 52a, suffer significant pressure losses.

There are also oil supply devices with two annular, staged, coaxial lubrication cups, each supplying different oil distribution circuits of the reduction gear and configured to receive the oil from two oil injection means, so as to form two separate lubrication stages. The oil injection means are injection manifolds providing oil jets centrifugally. Therefore, the injection manifolds are close to the axis of the reduction gear and are difficult to mount.

The invention overcomes this disadvantage by proposing a staged impeller with independent cups that can be supplied centripetally by an injection manifold further from the axis X and therefore easier to mount.

Figure 3:
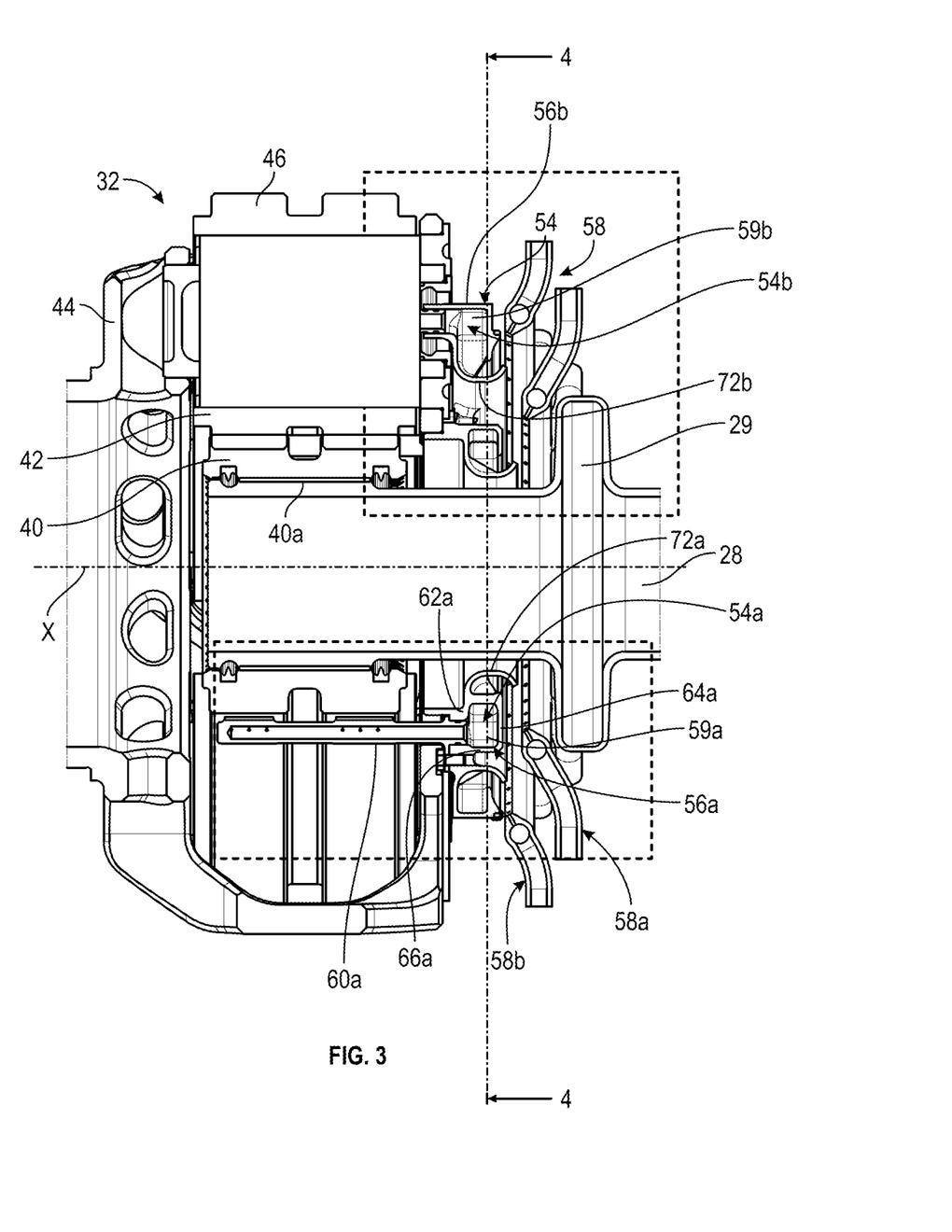
FIG. 3 is an axial sectional view of an epicyclic reduction gear equipped with an oil supply device according to the invention.

Similar to the previously described design, FIG. 3 shows an oil supply device 54 intended to supply oil to at least two oil distribution circuits 54a, 54b connected to a planet carrier 44 of an epicyclic reduction gear comprising at least one sun pinion 40, a planet carrier 44 and a ring gear (not shown) that are relatively mobile in rotation with respect to each other. It is noted that such an oil supply device 54 could be suitable for supplying oil to a differential reduction gear.

The oil comes from an oil injection system 58 comprising at least one oil injection means, which is fixed with respect to the reduction gear 32. The oil supply device 54 comprises at least one lubrication annular cup 56a which is integral of said planet carriers 44 and is substantially annular and open radially with respect to the axis X of the reduction gear 32. The walls of the cup 56a delimit a cavity 59a which receives oil from the oil injection means 58 and which supplies at least one of the oil distribution circuits 54a.

The invention is innovative with respect to the prior art in that the oil supply device 54 comprises a further lubrication annular cup 56b so as to be staged with at least two separate stages each comprising a cup 56a, 56b.

The lubrication annular cup 56b is also integral of said planet carrier 44 and is substantially annular and open radially with respect to the axis X of the reduction gear 32. The walls of cup 56b delimit a cavity 59b which receives oil from the oil injection means 58 and supplies the other oil distribution circuit 54b.

The cups 56a, 56b are coaxial along the axis X of the reduction gear 32, are of different diameters, and are both advantageously capable of receiving oil transmitted with a centripetal and/or axial component to each independently supply an associated oil circuit 54a, 54b.

In the remainder of this description, an oil supply device 54 is considered to comprise two cups 56a, 56b, but it will be understood that this configuration is not limiting the invention and that the oil supply device 54 could comprise a greater number of cups.

In any case, the oil supply device 54 comprises at least one first annular cup 56a, the associated oil distribution circuit 54a of which comprises a plurality of spray nozzles 60a, which are distributed angularly and evenly around the axis X of the reduction gear, which are arranged close to the sun pinion and/or the planet gears, and which spray the sun pinion 40 and/or the planet gears 42.

Figure 7:
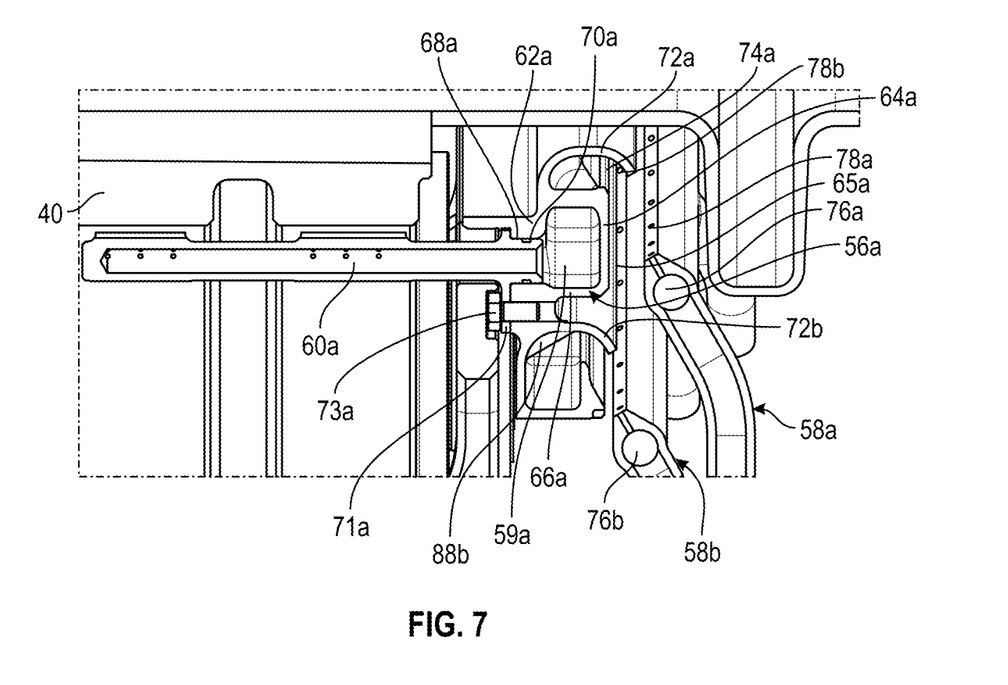
FIG. 7 is a detailed view of FIG. 3 showing a first cup of the oil supply device.

As shown in detail in FIG. 7, the first cup 56a comprises a first substantially annular wall 62a facing the planet carrier 44, a second substantially annular opposite wall 64a, both transverse to the axis X of the reduction gear and joined by a third peripheral wall 66a. The walls 62a 64a and 66a delimit at least one oil reservoir 59a corresponding to the cavity thus delimited and which supplies the oil distribution circuit 54a.

The nozzles 60a have here been represented flanged on the first cup 56a, but this configuration is not limiting the invention. The nozzle 60a was shown flanged on the first wall 62a and it comprises for this purpose a cylindrical bearing 68a which engages in a bore 70a formed in the first wall 62a, and a shoulder 71a resting on this wall and traversed by a screw 73a which is received in the first wall 62a to ensure the flanging of the nozzle 60a. The bore 70a constitutes a duct putting in communication the reservoir 59a with the nozzle 60a.

Alternatively, the nozzles 60a could be integrated in one piece into the cup 56a.

Similarly, the oil supply device 54 comprises a second annular cup 56b whose oil distribution circuit 54b feeds bearings (not shown) of the planet gears 42 on the planet carrier 44.

Figure 5:
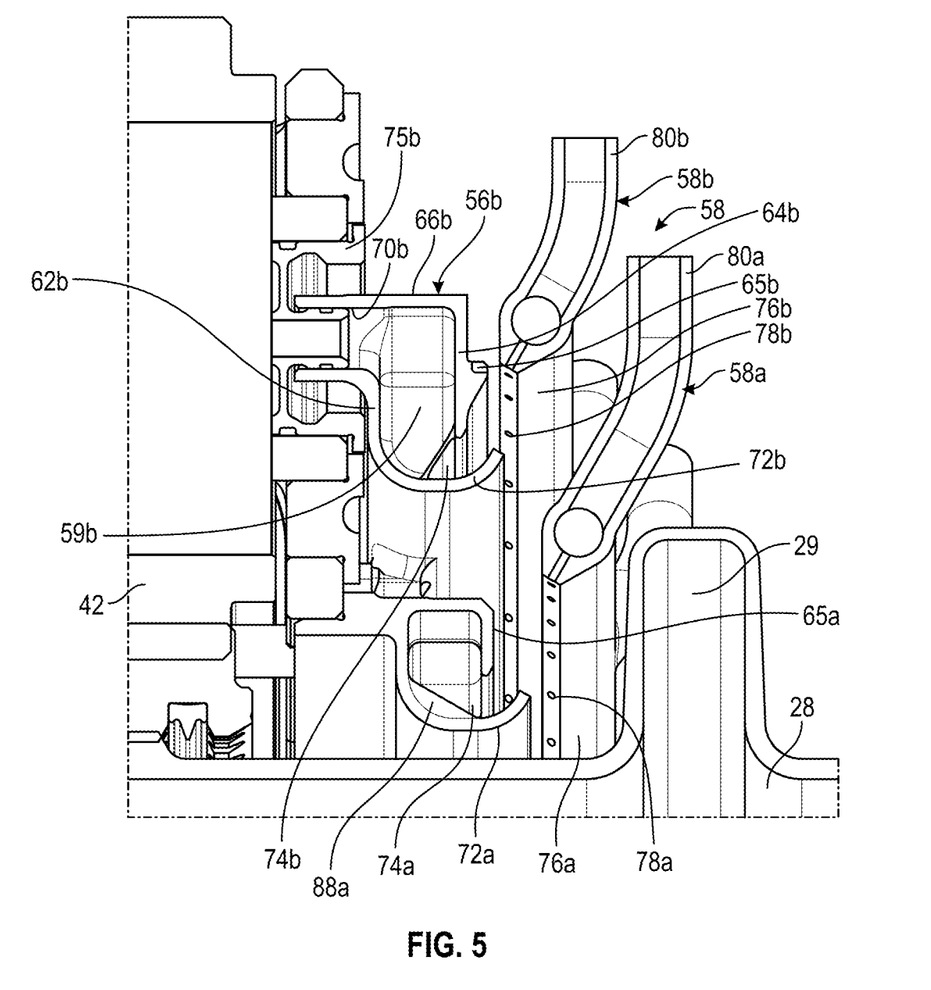
FIG. 5 is a detailed view of FIG. 3 showing a second cup of the oil supply device.

For example, as shown in detail in FIG. 5, the cup 56b comprises a first substantially annular wall 62b facing the planet carrier, a second substantially annular opposite wall 64b, both transverse to the axis of the reduction gear and joined by a third peripheral wall 66b. The walls 62b, 64b and 66b delimit at least one oil reservoir 59b corresponding to the cavity thus defined and supplying the oil distribution circuit 54b. The first wall 62b comprises ducts 70b connecting said reservoir 59b to the bearings of the planet gears 42. This communication is achieved by means of a male-to-male adapter 75b. This adapter 75b is integral with the axle of the bearing of the planet gear 42 and is connected to the female interface formed by the duct 70b, in which it is received.

The invention is innovative in that the cavities of reservoirs 59a, 59b are supplied with oil by axial jets along the axis X, and/or centrifugal jets turned in the direction of the axis X of the reduction gear, and/or tangential, unlike the known prior art designs which use centrifugal jets turned away from the axis X of the reduction gear. The oil jets are directed axially in a direction that is parallel to the axis X and facing the associated cup 56a, 56b, or centripetally in a radial direction facing the axis X, or tangentially or according to an inclined direction combining two of these directions.

As long as the jet direction comprises at least one centripetal radial component facing the axis X, this configuration allows to use an oil injection system 58 less close to the LP shaft 28, and therefore easier to mount. In addition, as shown in FIGS. 3 and 5, such a LP shaft 28 is, to counter the effects of misalignment within the turbomachine, generally equipped with a bellows-type, radially bulky flexibility device 29, which is located close to the reduction gear 32. The use of an oil injection system 58 with a centripetal component allows to mount this system around the flexibility device 29 without penalizing the total axial dimensions of the coupling of the reduction gear 32 to the LP shaft 28.

Overall, each cup 56a, 56b has an external part with a section substantially in the shape of a U of radial orientation open towards the axis, which corresponds to the first wall 62a, 62b, second wall 64a, 64b and third wall 66a, 66b delimiting the reservoirs 59a, 59b, and an internal part, delimiting a gutter and extending the external part starting from a branch of the U, i.e. here from the first walls 62a, 62b.

The third walls 66a, 66b of the cups 56a, 56b are, with respect to the cavities forming the reservoirs 59a, 59b that they delimit, arranged opposite the axis of the reduction gear. Each first wall 62a, 62b is extended by an annular gutter 72a, 72b which extends axially beyond the second wall 64a, 64b and which is configured to receive the oil projected by the injection means of the oil injection system 58.

In the figures, without limitation, the gutters 72a, 72b are substantially J-shaped, and their concavity 74a, 74b faces away from the axis X of the reduction gear 32 so as to receive oil jets inclined according to a direction having at least one radial centripetal component facing the axis X and an axial component or axial and tangential component facing the cups 56a, 56b.

Alternatively, the gutters 72a, 72b could be V-shaped and be supplied in the same way, or L-shaped open opposite the cups and in this case be supplied by purely axial jets or axial and tangential jets.

This configuration also allows the oil supply device 54 to be supplied by a staged oil injection system 58 comprising at least two independent oil injection means 58a, 58b each supplying a corresponding cup 56a, 56b of the oil supply device 54.

This configuration is particularly advantageous because it avoids the problems of pressure drop inherent to the supply of oil from a single cup, and also because it allows a differentiated oil supply to the cups 56a, 56b. Thus, it is possible to differentiate the type of lubricant used, in particular in terms of viscosity, temperature or filtration, in order to use lubricants with different properties adapted to the needs of the members or gears to be lubricated. For example, the bearings of the planet gears 42 can be supplied with a different oil from the one used to lubricate the gears between the sun gear 40 and the planet gears 42. Thus, each oil injection means 58a, 58b is supplied with an oil adapted to the needs of the member of the reduction gear 32 which is lubricated by the corresponding cup 56a, 56b.

The oils used can thus be different oils which are filtered in different ways in order to obtain oils comprising different minimum particle sizes to meet different and specific lubrication requirements.

As shown in FIGS. 3, 5, 7, and 9, each oil injection means 58a, 58b has an annular tubular manifold 76a, 76b, with a diameter substantially slightly larger than that of the gutter 72a, 72b of the corresponding cup 56a, 56b, and comprising uniformly distributed holes 78a, 78b. As shown in FIGS. 5 and 7, these holes 78a, 78b are turned towards the gutter 72a, 72b of the cup 56a, 56b at a certain angle to the axis X to improve the oil supply. This angle is preferably chosen so that the jet has a radial component towards the axis X, an axial component towards the cup 56a, 56b, and possibly a tangential component, i.e. perpendicular to the plane of FIGS. 3, 5, and 7.

Figure 9:
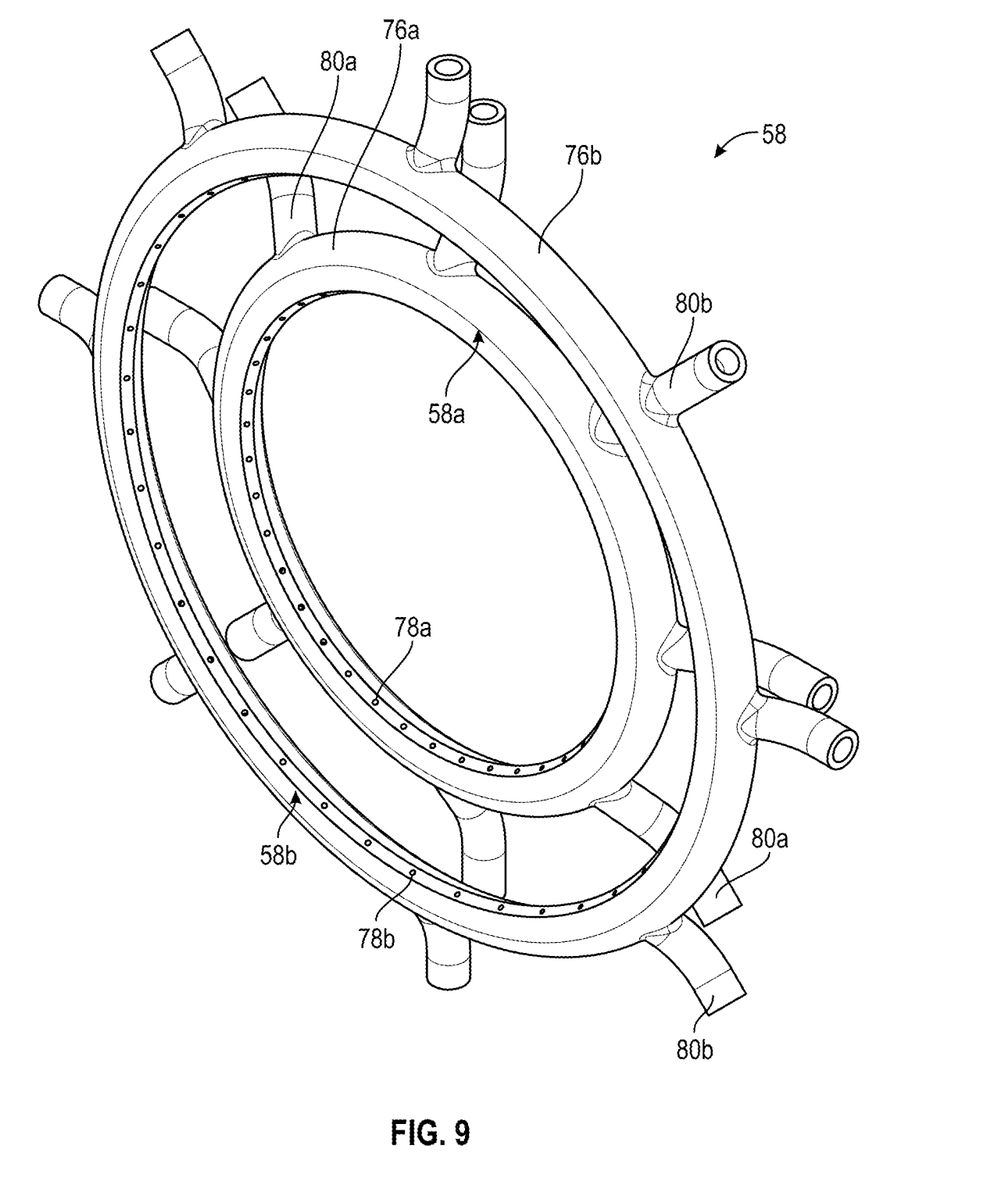
FIG. 9 is a perspective view of an oil injection system for an oil supply device according to the invention.

Furthermore, as shown in FIG. 9, each oil injection means 58a, 58b comprises at least one globally radial oil supply duct 80a, 80b to the annular manifolds 76a, 76b. Preferably, each oil injection means 58a, 58b comprises a plurality of uniformly distributed ducts 80a, 80b to ensure uniform supply to the manifold 76a, 76b in terms of the flow rate and velocity.

It should be noted that the manifolds 76a, 76b are not necessarily continuous. For example, each oil injection means 58a, 58b could comprise a plurality of angled segments of annular manifolds 76a, 76b each supplied by at least one duct 80a, 80b.

The oil injection means are carried by a casing (not shown) of the turbomachine. Therefore, they are not necessarily connected to each other. If the oil injection means are distant from each other, the jets of one cannot disturb the jets of the other, which is an additional advantage of the invention.

It is all the same for the cups 56a, 56b which may or may not be connected together by structural arms, depending on the constraints of coaxiality, rigidity and hyperstatism during the assembly.

Figure 4:
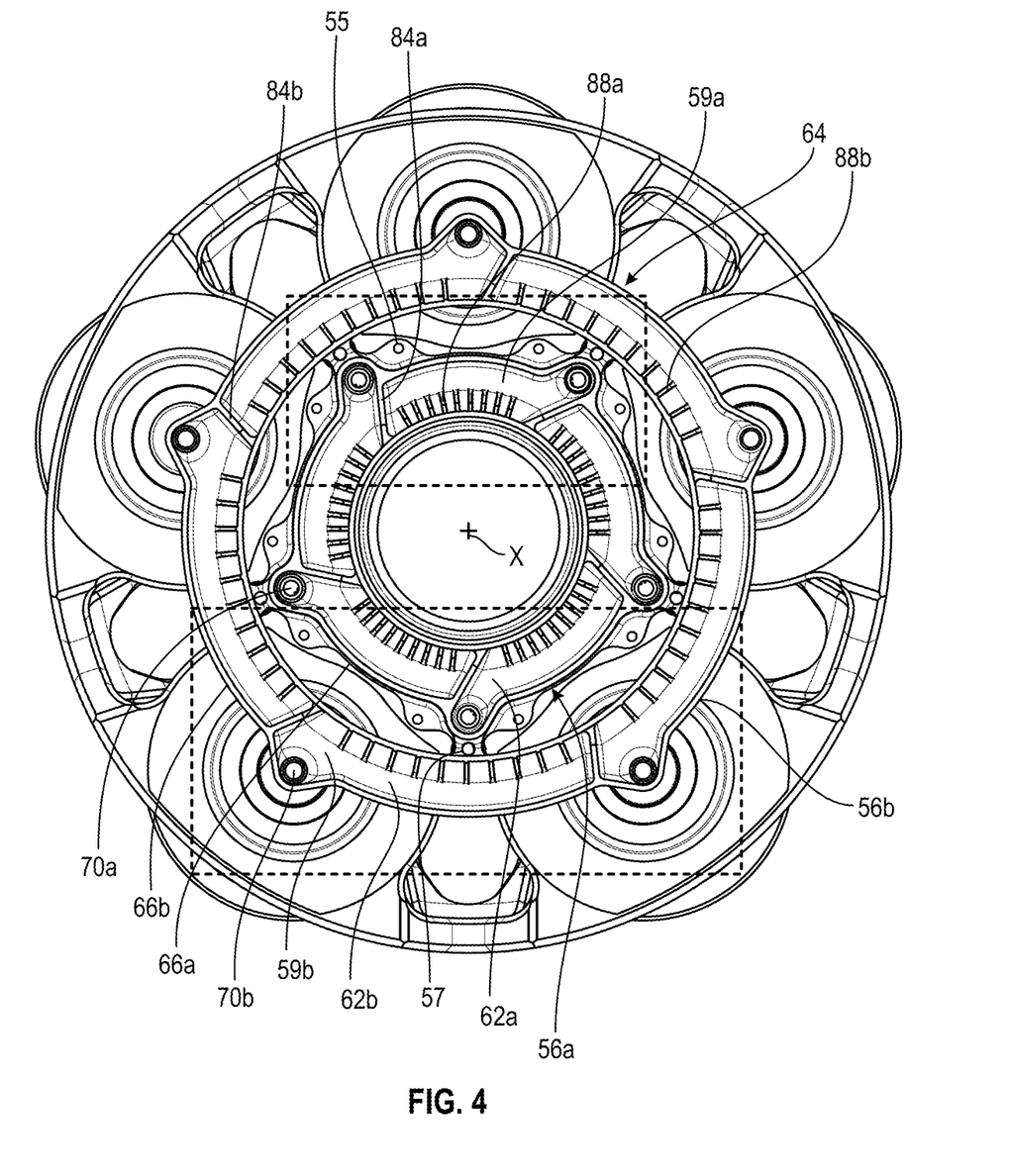
FIG. 4 is a cross-sectional view through the plane 4-4 of FIG. 3 of the epicyclic reduction gear equipped with an oil supply device according to the invention.

In the non-limiting example detailed here, the cup 56a is connected to the cup 56b by structural arms 57, as shown in FIG. 4. The cups 56a, 56b then form an impeller 54.

Figure 6:
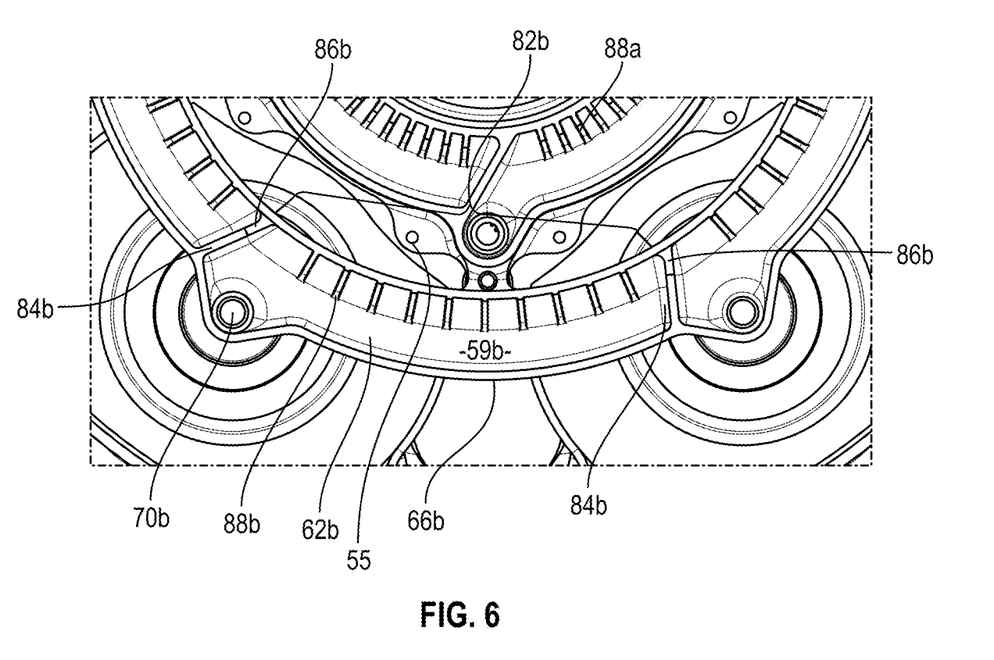
FIG. 6 is a detailed view of FIG. 4 showing the second cup of the oil supply device.
Figure 8:
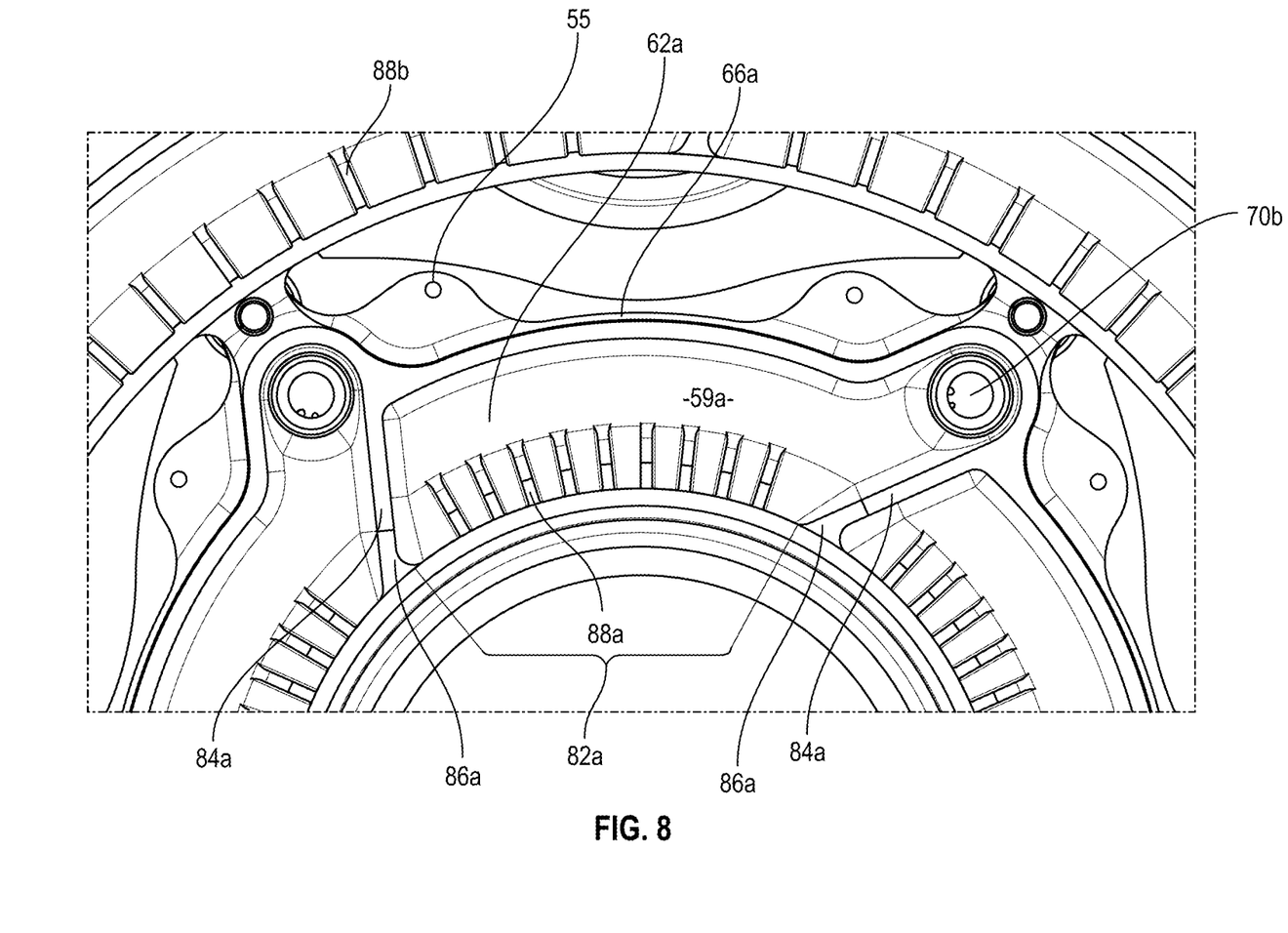
FIG. 8 is a detailed view of FIG. 4 showing the first cup of the oil supply device.

The oil supply device is flange-mounted on the planet carrier via axial elements such as screws passing through holes 55, visible in FIGS. 4, 6, and 8.

Various means are provided for balancing the impeller 54.

For example, at least one cup may comprise an extra thickness that can be machined locally to balance the cup.

Here, as shown in FIG. 5, it is the second wall 64b of the cup 56b, which comprises an over-thickness in a zone 65b that can be machined locally to balance this cup 56b.

Alternatively, at least one cup may comprise a zone capable of receiving at least one balancing weight from this cup.

Here, as shown in FIGS. 5 and 7, the second wall 64a of the cup 56a comprises a zone 65a capable of receiving at least one balancing weight (not shown) from this cup 56a.

In addition, the means are provided to improve the collection of the oil through the gutters 72a, 72b of the cups 56a, 56b and to convey it to the reservoirs 59a, 59b.

For this purpose, as illustrated in FIGS. 4, 6, and 8 the external part of each cup 56a, 56b, that is, the part corresponding to the first wall 62a, 62b, second wall 64a, 64b and third wall 66a, 66b which delimits the reservoirs 59a, 59b, is divided angularly, between its first and second walls 62a, 64b and 62b, 64b respectively, into adjoining compartments 82a, 82b which delimit as many reservoirs 59a, 59b. This delimitation is ensured by axial walls 84a, 84b arranged at the angular ends of these compartments 82a, 82b.

As can be seen in the example presented here as a non-limiting example, each cup 56a, 56b comprises five compartments 82a, 82b, but it will be understood that this number is not limiting to the invention.

Advantageously, as can be seen in FIGS. 6 and 8, the free ends 86a, 86b of the walls 84a, 84b are bevelled and inclined towards the axis X of the reduction gear to allow the passage of oil from a reservoir 59a, 59b of one compartment 82a, 82b to the reservoir 59a, 59b of the neighbouring compartment.

The walls 84a and 84b can be inclined to help guide the oil.

The annular gutter 72a, 72b is continuous along the entire periphery of the corresponding cup 56a, 56b.

This configuration improves oil distribution between compartments. If all the reservoirs 59a, 59b are full, the oil will overflow to the axis X of the reduction gear 32.

In addition, the gutter-shaped inner part of each cup 56a, 56b comprises fins 88a, 88b that extend generally in a radial direction between the gutter 72a, 72b and at least the second wall 62a, 62b. These fins 88a, 88b are configured to drive the oil by centrifugation to the bottom of the corresponding reservoir 59a, 59b. Note that the fins 88a, 88b can go beyond the second walls 62a, 62b and extend to the bottom of the corresponding reservoir, i.e. to the third peripheral walls 66a, 66b.

In FIGS. 4 to 8, fins 88a, 88b which are radial have been shown, but these can also be inclined with respect to the radial direction, and/or have a vane profile.

In FIGS. 4, 6 and 8, each cup 56a, 56b comprises only an inner part associated with a series of concentric reservoirs 59a, 59b and an associated inner part, these inner and outer parts occupying the entire radial footprint of the cup.

It is quite conceivable that a cup comprises several series of concentric outer and inner parts, divided at different angular pitches, to form angularly successive patterns that create reservoirs placed on different diameters and feeding nozzles placed on different diameters.

The invention also provides a method of assembling an epicyclic or planetary gear reduction gear comprising a lubrication set comprising an oil supply device 54 and an oil injection system 58.

Figure 10:
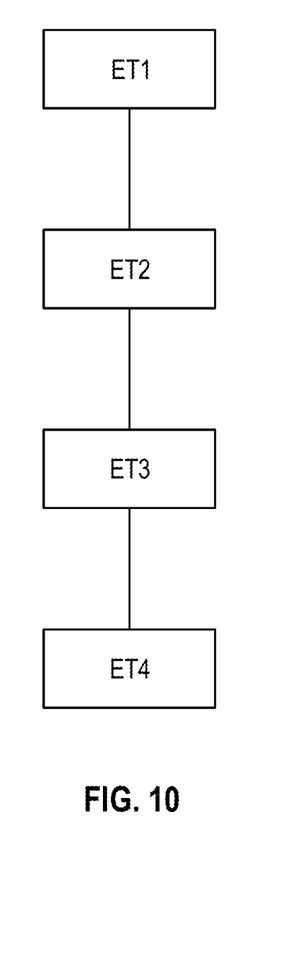
FIG. 10 is a block diagram illustrating the steps of a method for assembling an epicyclic reduction gear with a lubrication set according to the invention.

As shown in FIG. 10, this method comprises a first step ET1 of assembly of the reduction gear 32 wherein the sun pinion 40, the planet carrier 44 with its planet gears 42 and the ring gear 46 are assembled together.

Then, in a second step ET2, the oil supply device 54 is introduced into the reduction gear 32.

Then, in a third step ET3, a turbomachine with a LP turbine shaft 28 configured to be inserted into the sun gear 40 is installed, and the oil injection system 58 is attached to a casing (not shown) of said turbomachine.

Finally, in a fourth step ET4, the reduction gear is inserted into the engine frame by inserting the LP turbine shaft 28 into the sun gear. The oil injection system 58 is naturally ideally positioned to supply the impeller 54 once the reduction gear is mounted.

The invention allows to propose a differentiated, simple, reliable and effective lubrication for the various members of a turbomachine reduction gear.

The invention claimed is:

1. An oil supply device extending around an axis, intended to supply oil to two distinct oil distribution circuits of a reduction gear, the reduction gear comprising at least one sun pinion, a planet carrier and a ring gear which are mobile in rotation relatively with respect to each other, the oil coming from at least one oil injection means fixed with respect to the reduction gear, said device being configured to be fixed to the planet carrier and comprising a first lubrication annular cup configured to receive oil coming from said at least one oil injection means and to allow the supply of oil to one of said oil distribution circuits, the device comprising at least one second lubrication cup so that it can be staged in at least two separate lubrication stages, the further cup being configured to receive oil coming from a further oil injection means and to allow the supply of oil to a further of said oil distribution circuits, each cup supplying an associated and distinct oil circuit, the cups being coaxial and of different diameters, wherein said cups are both configured to receive oil jets that are directed:
in an axial direction that is parallel to the axis and facing the associated cup, or
in a centripetal direction directed radially toward the axis, or
in a tangential direction with respect to the axis, or
according to an inclined direction combining the axial direction that is parallel to the axis and facing the associated cup and the centripetal direction directed radially toward the axis, or
according to an inclined direction combining the centripetal direction directed radially toward the axis and the tangential direction with respect to the axis, or
according to an inclined direction combining the axial direction that is parallel to the axis and facing the associated cup and the tangential direction with respect to the axis.

2. The device according to claim 1, wherein it comprises at least:
the first annular cup, the associated oil distribution circuit of which comprises a plurality of nozzles distributed circumferentially around the axis and which supply oil to the sun pinion or to the planet gears, or to both the sun pinion and the planet gears, and
the second annular cup, the associated oil distribution circuit of which supplies oil to planet gear bearings of the planet carrier.

3. The device according to claim 1, wherein at least one of the first and second annular cups has an outer part having a section substantially in the shape of a U of radial orientation open towards the axis and an inner part extending the outer part starting from a branch of the U which delimits a J- or V-shaped gutter configured to receive oil jets inclined according to a direction having at least one radial centripetal component facing the axis and an axial component or axial and tangential component facing towards the cups, or an open L-shaped gutter opposite the cups supplied by purely axial oil jets or axial and tangential oil jets.

4. The device according to claim 3, wherein said at least one of the first and second annular cups is divided circumferentially into adjoining compartments which delimit as many reservoirs as there are compartments, said reservoirs supplying the oil distribution circuits, and being separated by axial walls arranged at the angular ends of said compartments, free ends of said axial walls being bevelled towards the axis of the reduction gear to allow the passage of oil from a reservoir of one compartment to the reservoir of the adjacent compartment.

5. The device according to claim 3, wherein the gutter comprises fins extending substantially in a radial direction and which are arranged to drive the oil by centrifugation at the bottom of each of the reservoirs.

6. The device according to claim 5, wherein the fins are at least one of radial, inclined with respect to the radial direction, and have a vane profile.

7. The device according to claim 1, wherein each first or second annular cup is connected to the adjacent second or first annular cup by structural arms.

8. The device according to claim 3, wherein at least one of the first and second annular cups comprises a zone having an over thickness, said zone being able to be machined locally to allow the balancing of said cup.

9. The device according to claim 3, wherein at least one of the first and second annular cups comprises a zone having at least one weight member configured to balance said cup.

10. An oil injection system for supplying oil to the oil supply device according to claim 3, wherein said oil supply device is staged and comprises the at least two distinct oil injection means, each supplying a corresponding cup of the first and second annular cups of the device.

11. The oil injection system according to claim 10, wherein each oil injection means of a cup comprises an annular tubular injection manifold, or a plurality of circumferential segments of annular tubular manifold, of diameter substantially slightly larger than that of the corresponding cup, comprising circumferentially distributed holes being configured to be oriented towards the opening of the gutter of the corresponding cup and at least one mainly radial ducts for supplying oil to said annular manifold or said annular manifold circumferential segment.

12. The oil injection system according to claim 10, wherein each oil injection means is supplied with an oil adapted to the requirements of a member of the reduction gear which is lubricated by the corresponding cup.

13. A lubrication set for an epicyclic or differential reduction gear, comprising the oil supply device according to claim 1.

14. A lubrication set for a epicyclic or differential reduction gear, comprising the oil injection system according to claim 10.

* * * * *

UNITED STATES PATENT AND TRADEMARK OFFICE
CERTIFICATE OF CORRECTION

PATENT NO. : 11,396,941 B2  
APPLICATION NO. : 17/095670  
DATED : July 26, 2022  
INVENTOR(S) : Antoine Jacques Marie Pennacino and Jean-Charles Michel Pierre Di Giovanni

Page 1 of 1

It is certified that error appears in the above-identified patent and that said Letters Patent is hereby corrected as shown below:

On the Title Page

Item [30] insert:  
--Foreign Application Priority Data  
Nov. 15, 2019 (FR) ..................... 1912786--

Signed and Sealed this  
Twenty-seventh Day of September, 2022

Katherine Kelly Vidal  
*Director of the United States Patent and Trademark Office*